US008855626B2

(12) United States Patent
O'Toole et al.

(10) Patent No.: US 8,855,626 B2
(45) Date of Patent: Oct. 7, 2014

(54) WIRELESS CONTROL FOR CREATION OF, AND COMMAND RESPONSE TO, STANDARD FREIGHT SHIPMENT MESSAGES

(75) Inventors: Arthur J. O'Toole, Fredon, NJ (US); Thomas A. Robinson, Mendham, NJ (US)

(73) Assignee: Startrak Information Technologies, LLC, Fort Lee, NJ (US)

( * ) Notice: Subject to any disclaimer, the term of this patent is extended or adjusted under 35 U.S.C. 154(b) by 80 days.

(21) Appl. No.: 12/763,188

(22) Filed: Apr. 19, 2010

(65) Prior Publication Data

US 2010/0321179 A1 Dec. 23, 2010

Related U.S. Application Data

(63) Continuation of application No. 10/562,402, filed as application No. PCT/US2004/020503 on Jun. 24, 2004, now Pat. No. 7,702,327.

(60) Provisional application No. 60/480,980, filed on Jun. 24, 2003, provisional application No. 60/582,258, filed on Jun. 23, 2004, provisional application No. 60/482,889, filed on Jun. 26, 2003.

(51) Int. Cl.
| H04M 3/42 | (2006.01) |
| H04W 24/00 | (2009.01) |
| G08B 25/14 | (2006.01) |
| G06Q 10/08 | (2012.01) |
| G08B 25/00 | (2006.01) |

(52) U.S. Cl.
CPC ............ *G06Q 10/08* (2013.01); *G08B 25/14* (2013.01); *G08B 25/009* (2013.01)
USPC ...................................... 455/425; 455/414.1

(58) Field of Classification Search
USPC ........................................................ 455/425
See application file for complete search history.

(56) References Cited

U.S. PATENT DOCUMENTS

| 5,999,091 | A  | * | 12/1999 | Wortham ....................... 340/431 |
| 6,429,810 | B1 | * | 8/2002 | De Roche ................ 342/357.75 |
| 6,865,516 | B1 | * | 3/2005 | Richardson .................... 702/188 |
| 2002/0111819 | A1 | * | 8/2002 | Li et al. ............................. 705/1 |
| 2003/0004792 | A1 | * | 1/2003 | Townzen et al. .................. 705/13 |
| 2003/0028577 | A1 | * | 2/2003 | Dorland et al. ................ 709/100 |
| 2003/0069648 | A1 | * | 4/2003 | Douglas et al. .................... 700/2 |
| 2003/0179073 | A1 | * | 9/2003 | Ghazarian ...................... 340/5.6 |
| 2004/0026529 | A1 | * | 2/2004 | Float et al. ......................... 239/63 |

* cited by examiner

*Primary Examiner* — Lester Kincaid
*Assistant Examiner* — Andy Gu
(74) *Attorney, Agent, or Firm* — Drinker Biddle & Reath LLP

(57) ABSTRACT

A freight management arrangement includes a monitor system that communicates over wireless with a large number of freight assets by land and with smaller number of users each associated with a fleet of the freight assets. The monitor system polls sensed ambient data in the freight assets on the basis of requests from the users. The requests may be stored as data in the monitor system or occur on a real-time basis.

11 Claims, 4 Drawing Sheets

WIRELESS CONTROL FOR CREATION OF, AND COMMAND RESPONSE TO, STANDARD FREIGHT SHIPMENT MESSAGES

RELATED APPLICATIONS

This application is a continuation of U.S. Ser. No. 10/562,402 filed Feb. 28, 2007, issued as U.S. Pat. No. 7,702,327 on Apr. 20, 2010, which is the US national phase entry of PCT/US2004/020503 filed Jun. 24, 2004. The contents of these applications are hereby incorporated herein as if fully recited herein. This application claims the benefit of the following applications and their filing dates and these applications are incorporated herein by reference as if fully recited herein: U.S. 60/480,980 filed 24 May 2003; U.S. 60/582,258 filed 25 Jun. 2003; and U.S. 60/482,889 filed 26 Jun. 2003.

FIELD OF THE INVENTION

This invention relates to remote control of freight assets during transit or other states.

BACKGROUND OF THE INVENTION

Condition of freight assets such as refrigeration temperatures, locations, etc, have in the past been detected by sensors, and various alarms and signals alerted attendants and managers of adverse conditions. Such systems have been cumbersome and presented difficulties for remote managers and attendants because of limitations of the communication systems.

SUMMARY OF THE INVENTION

An embodiment of the invention involves transmitting sensed conditions of freight assets via one format suitable for the sensors to a monitoring system, which sends the data to a user utilizing another, user compatible, format.

Another embodiment involves the monitoring system comparing the sensed conditions with requirements from a user and sending the discrepancy to the user.

Another embodiment involves the monitoring system commanding devices of the freight asset to correct discrepancies.

These and other aspects of the invention are pointed out in the claims. Objects and advantages of the invention will become evident from the following detailed description when read in light of the accompanying drawings.

DETAILED DESCRIPTION OF PREFERRED EMBODIMENTS

Figure 1:
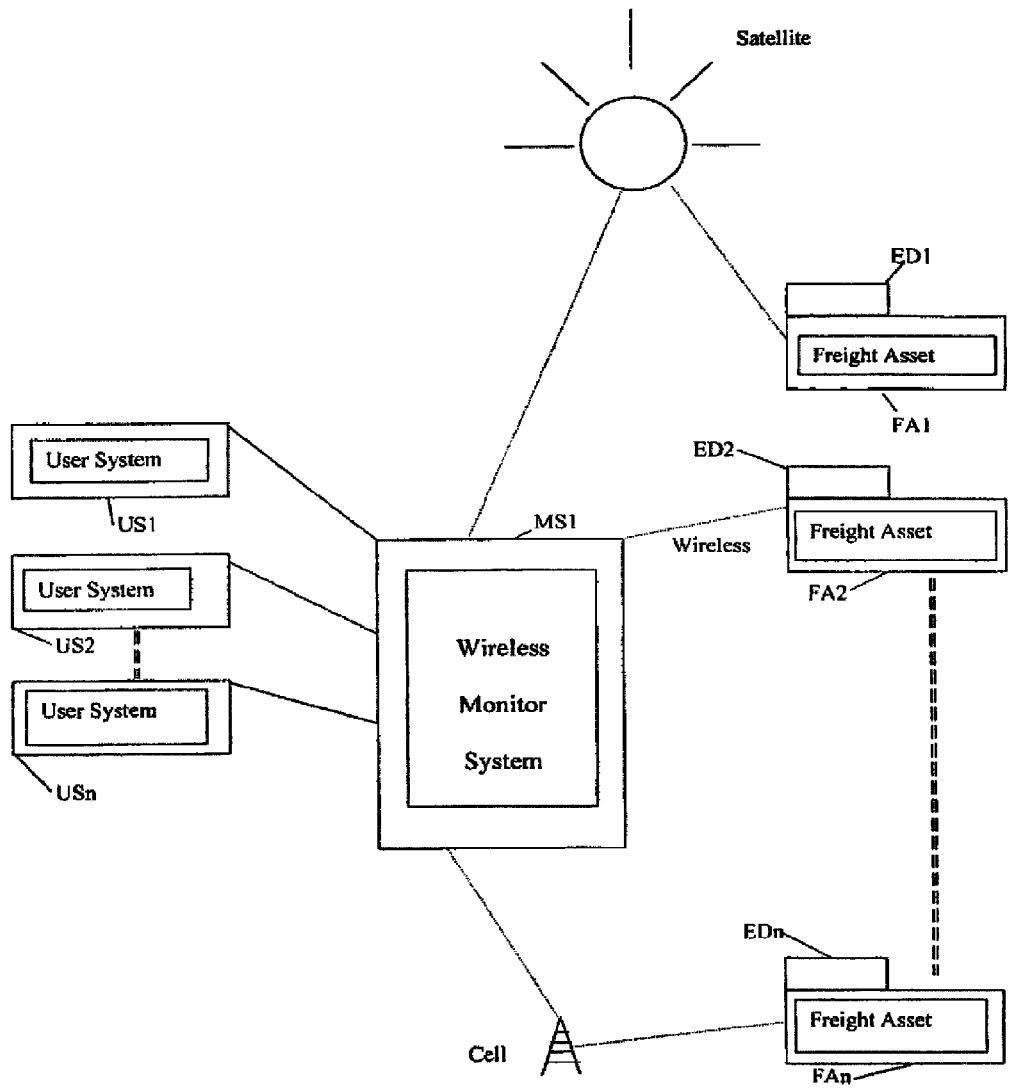
FIG. 1 is a general schematic diagram illustrating an overall system embodying the invention.

FIG. 1 is a schematic illustration of an over all system embodying the invention. Here, a multiplicity of users US1, US2, ... USn connect over respective communication links to a wireless monitor system MS1. There may for example be one hundred users so that the character n represents one hundred. The communication links are preferably wire or cable but can also be wireless, internet, satellite, or other communication paths.

The wireless monitor system MS1 communicates over various communication links such as satellite, cell phone, radio, etc. with fleets of freight assets FA1, FA2, ... FAn. The number of freight assets FA1, FA2, ... FAn may for example be one thousand for each user US1, US2, ... USn, for a total one hundred thousand freight assets.

The wireless monitoring system MS1 responds to signals from the users US1, US2, ... USn, and in turn sends signals to the users, and also communicates with the freight assets FA1, FA2, ... FAn to furnish wireless monitoring and tracking of the freight assets. The wireless monitoring system MS1 provides services to the multiple users simultaneously and retains database information regarding a fleet of freight assets associated with each of the users. The wireless monitoring system MS1 serves as a communications platform for sending polling inquires to the individual freight assets FA1, FA2, FAn over the multiple communication networks, such as satellite, cellular, and radio frequency networks. The wireless monitoring system MS1 communicates via EDI standards in multiple communication platforms to a collection of freight assets FA1, FA2, ... FAn for multiple system users. The wireless monitoring system MS1 makes use of the economy of scale for supporting different communications networks in different system users for similar application.

The communications may be carried out over multiple frequencies, using time division multiplexing where desired. The monitoring system MS1 maintains a database which determines the particular ones of the freight assets FA1, FA2, ... FAn that are owned or belong to or are associated with the particular users US1, US2, ... USn. The system MS1 also maintains information concerning the particular event or condition within the freight asset that the user desires to be controlled. Each of the freight assets FA1, FA2, ... FAn includes an intelligent electronic device ED1 that serves to communicate one or more of a number of monitored conditions within the freight assets. Such conditions may for example include any one or more environmental or ambient circumstances such as temperature, location, speed, direction of movement, vibration, load, humidity, ambient gas, illumination, radiation, etc.

This arrangement utilizes wireless intelligence on a freight asset to evaluate status conditions that automatically trigger transmissions and generate industry standard freight industry messages, which may be used for tracking and monitoring of freight assets and shipments. A corollary of the invention utilizes industry standard freight shipment messages that are evaluated against wireless messages transmitted from a freight asset with wireless intelligence to send command actions to the asset, which change or alter a monitored freight condition. Another corollary involves a method that permits a user to create an industry standard freight message by sending a wireless notification to an asset, which responds to the notification with a wireless transmission, and results in an industry standard freight message.

Figure 2:
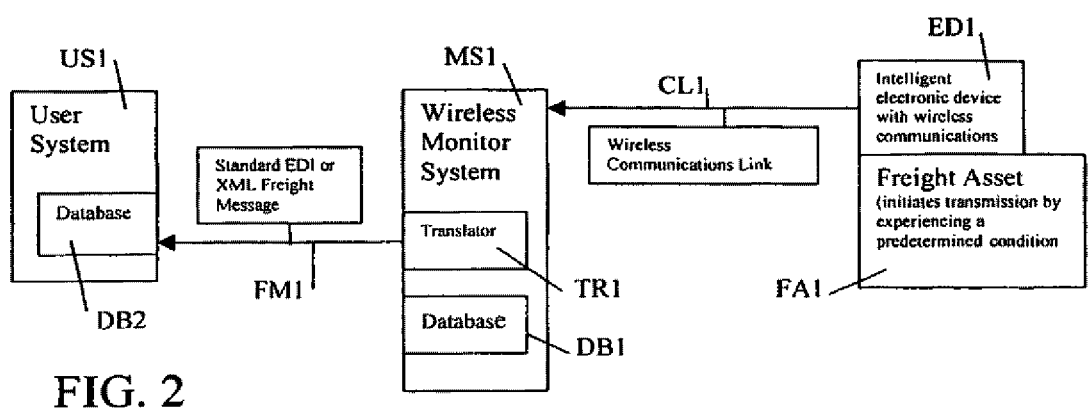
FIG. 2 is a schematic illustration of one embodiment of the invention.

A detailed embodiment of the invention appears in FIG. 2. Here, a specialized aspect of this invention involves a particular condition of a freight asset FA1, monitored in real-time, which creates an alarm or event condition concerning the asset within an intelligent electronic device ED1, by virtue of the intelligence of that device. The freight asset FA1 may be any one or more conveyances such as a truck, tractor, bus, railroad car, ship, boat, and their contents, and also include any one or more of warehouses or storage facilities and their contents. The monitored condition includes any one or more of environmental or ambient circumstances such as temperature, location, speed, direction of movement, vibration, load, humidity, ambient gas, illumination, radiation, etc. The alarm or event condition is sent via an encoded wireless communications link CL1 to a wireless monitor system MS1 having a database DB1. The wireless monitor system may be a ground based receiving and transmitting service station or facility with both wireless and groundline, such as wire, cable, optical fiber, etc. communication ability. The wireless message from the electronic device ED1 is encoded particularly for the bandwidth restrictions of the wireless communication link CL1. The wireless message may be communicated by radio waves, satellite, microwaves, laser, etc. The wireless monitor system MS1 receives the wireless freight message FM1 and contains a translator TR1 that formats the message into an industry standard user format, such as Electronic Data Exchange (EDI) or Extensible Mark-up Language (XML) freight message FM1 containing relevant information regarding the asset. The translator TR1 transmits the message FM1 in the user format to users at a user system US1 having information systems that accommodate the standard user format message types such as EDI or XML, and have a database DB2. The user system may be the headquarters or communication center, or executive office of a user whose managers require the information for their operation. This process permits the intelligent electronic device ED1 of the monitoring system on the freight asset FA1 to transmit standard, "open systems" messages, which are delivered into the existing information systems of user's of freight equipment.

The device ED1 on the asset FA1 automatically evaluates a particular condition to provide information that is normally derived from other sources (i.e. wayside monitoring systems that tell when an asset passes by and human creation of events that occur at under specific conditions). One example of this embodiment of the invention involves the local knowledge of location of the asset FA1, by use of a geographic positioning system (gps) sensor or equivalent, when the asset FA1 moved into a user designated location, where the asset FA1 would generate a wireless message, formatted into an industry standard message by the translator TR1 for delivery into the user system US1 and its database DB2. The newly formatted message from the translator TR1 contains information delivered from the asset FA1, including for example, gps location, time of arrival or departure, and the condition of the freight (door position, temperature, set point temperature, presence of auxiliary equipment, etc.).

Another example of this process involves a laborer changing the temperature set point on the asset FA1, such as a refrigerated trailer or railcar, which causes the device ED1 to generate an encoded wireless message that the translator TR1 ultimately delivers as a standard industry message FM1 to the user at user system US1 with its database DB2. With these given messages, the user may compare the wireless generated information from equipment located on the asset to shipping records and provide immediate context to the shipment without the need for local reading devices or operator inputs. FIG. 2 illustrates steps in the operation.

Figure 4:
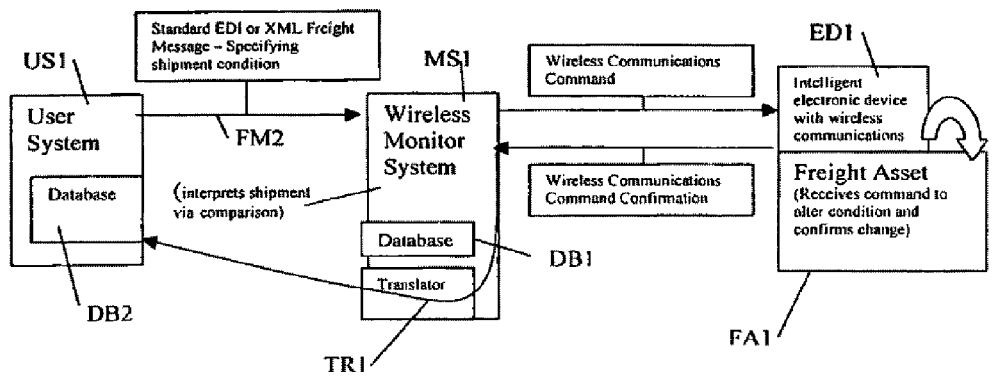
FIG. 4 is a schematic illustration of another embodiment of the invention.
Figure 5:
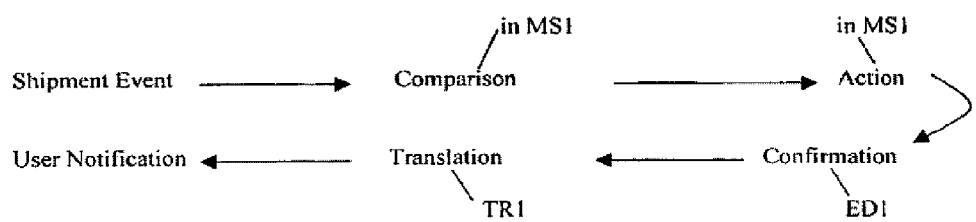
FIG. 5 is a representation showing the operation of FIG. 4.

Another embodiment appears in FIGS. 4 and 5. This involves the generation of a wireless command by the monitor system MS1 to the asset FA1 to change a condition based on a discrepancy between an industry standard freight message FM2 and information transmitted from the freight asset FA1 using encoded wireless communications via the device ED1. Upon the receipt of the industry standard freight message FM2 generated by the user system US1 with its database DB2 specific to an individual freight asset FA1, the monitor system MS1 compares recent encoded wireless messages from the asset FA1 via the electronic device ED1 to the newly received freight message FM2. Should an exception occur resulting from a discrepancy between the originating freight message FM2 and the encoded wireless message, which involve a specification for the freight shipment, such as a destination, temperature setting, routing violation, and recent wireless messages, then the monitor system MS1 sends a wireless command to the intelligent electronic device ED1 on the asset FA1, which changes the condition of the asset FA1. In one example, a user sends an industry standard freight message FM2, via the database DB2 to the monitor system MS1, specifying a specific temperature setting for a commodity contained within a specific freight asset FA1, and the temperature setting is compared to, and found different from, a recently received actual temperature setting received via encoded wireless communications from the asset FA1 via the device ED1. Then an automatic command is sent to the intelligent electronic device ED1 instructing it to change the temperature set point to the newly prescribed temperature setting of the message FM2. Upon enacting the change in temperature, the electronic device ED1 sends an encoded wireless message confirming that the action took place. The translator TR1 in turn forwards this message in an industry standard freight message EDI or XML. Another example involves the automatic sending of a command to a unit to lock the freight doors once the asset has left a prescribed location delivered to the monitor system MS1 via an industry standard message.

Figure 6:
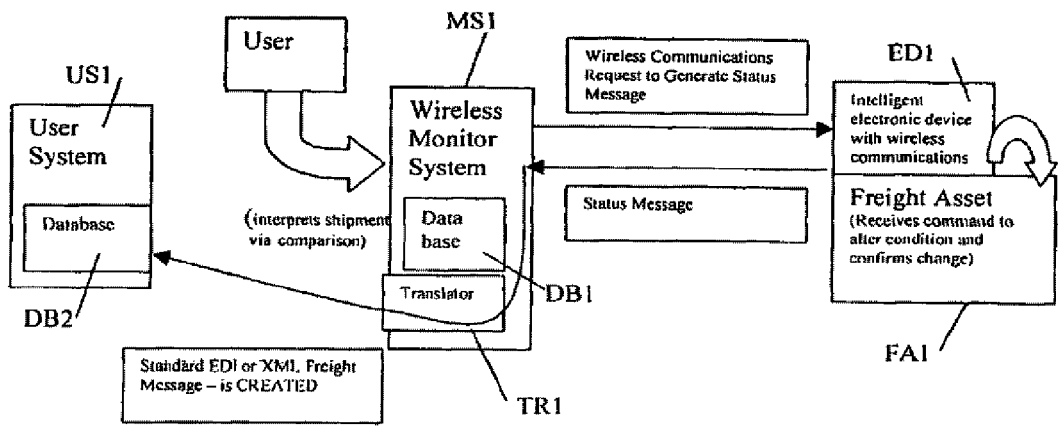
FIG. 6 is a schematic illustration of yet another embodiment of the invention.
Figure 7:
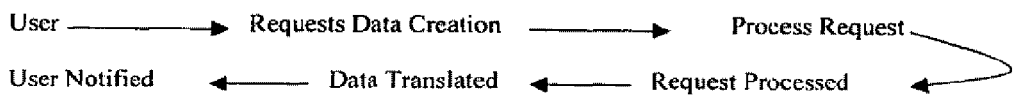
FIG. 7 is a representation showing the operation of FIG. 6.

Yet another embodiment appears in FIGS. 6 and 7. This involves a method to create a standard freight industry message by accessing a monitor system MS1 and sending a command via wireless communications to an intelligent device attached to a freight asset. Upon receipt of the command from the user via monitor system MS1, the intelligent device ED1 creates a transmission that results in an industry standard freight message in a method similar to the embodiments above.

Figure 3:
FIG. 3 is a representation showing the operation of FIG. 2.

In these embodiments, the standard freight messages FM1 involve, for example, bills of lading (404), waybills (417), Terminal Operations and Intermodal Ramp Activity (322) messages and car location messages, which contain relevant information about freight shipments. These messages, and related messages, are created from encoded wireless messages via satellite, cellular or radio frequency communications in the first embodiment, FIGS. 2 and 3. In an embodiment, these messages, and related messages, specify the actual conditions of the freight, and the wireless communications links assure, via control mechanisms, that the freight shipment meets the specification.

The invention permits real time transmission of freight asset conditions, freight control signals, and confirmation signals between wireless, e.g. satellite, transmission formats and standard message formats EDI or XML.

The database DB1 stores all incoming and outgoing messages to and from the wireless monitor system MS1. If the monitor system MS1 receives a message from the user system US1 with its database DB2 to alter the status of the freight asset FA1, the database DB1 stores the command as the translator TR1 transmits the message to the electronic device ED1. When the latter effects the requested change in the status of the freight asset FA1, it sends back a confirmation to the monitor system MS1 which compares the resulting change with the command stored in the database DB1 to assure compliance. The translator TR1 the sends the result via standard message formats EDI or XML to the user system US1 with its database DB2.

The database DB1 also stores contact information for alarms, as well as user preferences. The user may for example be a freight forwarding company, a railroad company, a truck company, a refrigeration company, etc.

The term freight assets may refer to a freight cars, motor trucks, the freight carried, their temperatures, destinations, and/or other conditions of operations. The freight assets can also include freight equipment, and its weights, loads, and pressures.

In FIG. 6 the user may address the wireless monitor system MS1 directly by telephone, e-mail, or web-address, etc.

The electronic device ED1 may from part of the freight assets FA1, FA2, . . . FAn, and may vary in the form from freight asset to freight asset.

While embodiments of the invention have been described in detail it will be evident to those skilled in the art that the invention may be embodied otherwise.

What is claimed is:

1. A centralized freight asset monitoring system comprising:
   a first receiver comprising an interface that inputs communication signals, the receiver receiving in real time a plurality of wireless messages, in a plurality of differing first formats that are not an industry standard freight message format and are encoded particularly for bandwidth restrictions of wireless communication links over which the wireless messages are sent, from a plurality of intelligent electronic devices associated with a plurality of freight assets, the wireless messages containing information of a monitored event or condition of the respective freight asset, wherein the receiver stores the information in a memory that holds a database of the wireless monitoring system;
   a translator of the wireless monitoring system that translates in real time, utilizing a processor, the received wireless messages based upon the receipt in the respective first format into a message in a second format that is an industry standard freight message format used in an information system of a user of the freight asset;
   a transmitter comprising an interface over which the messages in the second format are transmitted for delivery into the user information system based upon the translation;
   a second receiver comprising an interface via which a message is received from the user containing a first command message to change a condition of a first freight asset associated with a first of the intelligent electronic devices and a second command message to change a condition of second freight asset associated with a second of the intelligent electronic devices; and
   a second transmitter comprising an interface that:
      responsive to receiving the first command message from the user, transmits, over the interface, the first command message to the first intelligent electronic device in the respective first format associated with the first intelligent electronic device; and
      responsive to receiving the second command message from the user, transmits, over the interface, the second command message to the second intelligent electronic device in the respective first format associated with the second intelligent electronic device that differs from the first format associated with the first intelligent electronic device.

2. The system of claim 1, further comprising:
   a database that stores information of the user and the freight asset in a memory of the system, and associates the user with the freight asset.

3. The system of claim 2, wherein the database stores information of events or conditions pertaining to the freight assets, and associates those events and conditions with corresponding ones of the freight assets to which they pertain.

4. The system of claim 3, wherein the events or conditions relate to at least one of actual temperature, set point temperature, location, speed, direction of movement, vibration, load, humidity, ambient gas, illumination, radiation, time of arrival at or departure from a specified location, door position, or presence of auxiliary equipment, of the freight assets.

5. The system of claim 1, further comprising:
   a plurality of transmitter elements that send messages to a plurality of intelligent electronic devices over multiple communication networks, and a plurality of receiver elements that receive messages from the plurality of intelligent electronic devices over multiple communication networks.

6. The system of claim 5, wherein the communication networks include satellite, cellular, microwave, laser, and radio frequency types of networks.

7. The system of claim 1, wherein:
   the system provides freight monitoring services to a plurality of users; and
   for each of the users, the system provides monitoring services for a plurality of freight assets.

8. The system of claim 1, wherein a plurality of messages are communicated simultaneously to and from the system using multiplexing.

9. The system of claim 1, wherein the industry standard freight message format is one of Electronic Data Exchange (EDI) format and Extensible Mark-up Language (XML) format.

10. The system of claim 1, wherein the freight asset is at least one of a freight car, a motor truck, a freight carried by a motor truck, a freight carried by a freight car, a temperature of freight carried, or a weight of freight carried.

11. The system of claim 1, wherein the processor is utilized for:
   comparing contents of the first command message from the user to contents of a freight message from the first intelligent electronic device;
   determining if an exception condition exists based on the comparing; and
   responding to the first intelligent electronic device if the exception condition exists.

* * * * *